(12) United States Patent
Castro et al.

(10) Patent No.: US 12,164,149 B2
(45) Date of Patent: Dec. 10, 2024

(54) MULTICHANNEL OPTICAL TAP DEVICES

(71) Applicant: Panduit Corp., Tinley Park, IL (US)

(72) Inventors: Jose M. Castro, Naperville, IL (US);
Bulent Kose, Burr Ridge, IL (US);
Richard J. Pimpinella, Prairieville, LA (US); Robert A. Reid, Battle Ground, IN (US); Yu Huang, Orland Park, IL (US); Thomas M. Sedor, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 37 days.

(21) Appl. No.: 17/957,468

(22) Filed: Sep. 30, 2022

(65) Prior Publication Data
US 2024/0061177 A1 Feb. 22, 2024

Related U.S. Application Data

(60) Provisional application No. 63/398,293, filed on Aug. 16, 2022.

(51) Int. Cl.
*G02B 6/125* (2006.01)
*G02B 6/12* (2006.01)
*G02B 6/42* (2006.01)

(52) U.S. Cl.
CPC ......... *G02B 6/125* (2013.01); *G02B 6/12004* (2013.01); *G02B 6/4286* (2013.01); *G02B 6/4287* (2013.01)

(58) Field of Classification Search
None
See application file for complete search history.

(56) References Cited

U.S. PATENT DOCUMENTS

| | | | |
|---|---|---|---|
| 9,621,264 B2 | 4/2017 | Jiang | |
| 11,275,210 B1* | 3/2022 | Thompson | G02F 1/3132 |
| 11,782,209 B2* | 10/2023 | Wang | G02B 6/12002 |
| | | | 385/20 |
| 11,803,010 B2* | 10/2023 | Bian | G02B 6/125 |
| 2002/0145171 A1* | 10/2002 | Miyachi | G02B 6/125 |
| | | | 257/431 |
| 2003/0081902 A1* | 5/2003 | Blauvelt | G02B 6/1228 |
| | | | 385/39 |
| 2004/0141690 A1* | 7/2004 | Jacquin | G02B 6/2821 |
| | | | 385/39 |
| 2004/0156591 A1* | 8/2004 | Zheng | G02B 6/125 |
| | | | 385/14 |
| 2007/0211989 A1* | 9/2007 | Blauvelt | G02B 6/125 |
| | | | 385/28 |
| 2008/0106527 A1* | 5/2008 | Cornish | G06F 3/0421 |
| | | | 385/33 |
| 2015/0037032 A1* | 2/2015 | Xu | B23K 26/50 |
| | | | 219/121.61 |
| 2016/0238789 A1* | 8/2016 | Lagziel | G02B 6/125 |
| 2021/0080646 A1* | 3/2021 | Lu | G02B 6/12007 |

* cited by examiner

*Primary Examiner* — Jerry Rahll
(74) *Attorney, Agent, or Firm* — Christopher K. Marlow; Christopher S. Clancy; James H. Williams

(57) ABSTRACT

A multiport passive photonic light circuit chip has multiple waveguides written in at least two layers on a glass substrate. Some waveguides connect transmitting and receiving ports of an optical channel, some waveguides redirect a fraction of optical signals to some other receiving ports, and waveguides have circular cross-sectional shapes wherein a refractive index contrast is in the range of 0.2% to 2%.

1 Claim, 11 Drawing Sheets

FIG. 1A
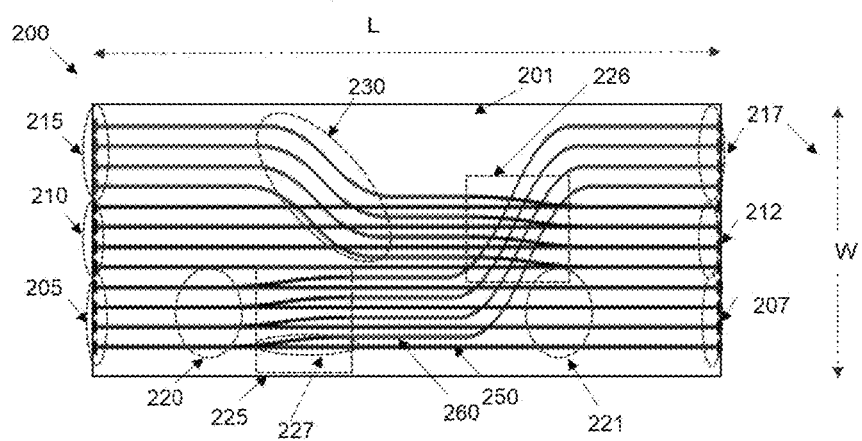
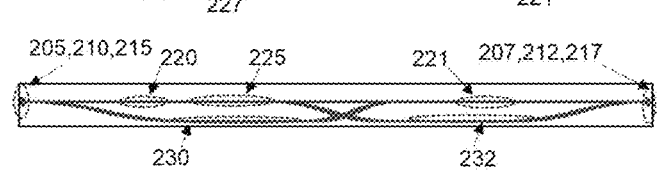
FIG. 1B
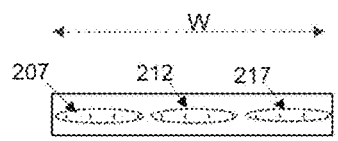
FIG. 1C

MULTICHANNEL OPTICAL TAP DEVICES

CROSS-REFERENCE TO RELATED APPLICATION(S)

This application claims benefit to U.S. Provisional Patent Application No. 63/398,293, filed on Aug. 16, 2022, the entirety of which is hereby incorporated by reference herein.

FIELD OF INVENTION

Disclosed is an apparatus and method to improve the traffic monitoring of Data Center networks using parallel optical taps of various port numbers or distributing optical signals at different balanced or unbalanced tap ratios. This disclosure enables smaller form factor apparatus facilitating the deployment of optical taps for security applications.

BACKGROUND

Datacenter architectures using optical fiber are evolving to meet the global traffic demands and the increasing number of users and applications. The rise of cloud data centers, particularly the hyperscale cloud, has significantly changed the enterprise information technology (IT) business structure, network systems, and topologies. Moreover, cloud data center requirements are impacting technology roadmaps and standardization.

Medium and large datacenters have replaced traditional three-tier switch architectures comprising Core, Aggregation, and Access (CAA) layers with Folded Clos networks (FCNs) or Spine-and-Leaf architecture, which provide the lower latency and better reliability for East-West traffic.

FCNs require a fabric mesh where all the Spine switches connect to the Leaf switches. To improve density and facilitate the deployment of complex mesh fabrics, FCNs commonly use transceivers capable of operating in breakout mode, which enables connectivity of a high-speed port to multiple lower-speed ports. For example, a switch port with 400GBASE-SR8 transceivers can be connected to eight servers, each one with one port with a 50GBASE-SR transceiver. Moreover, the breakout mode also enables a more efficient shuffle of the individual channel lanes, increasing the interconnection capacity per port and facilitating the implementation of mesh fabrics.

As data center networks become larger, monitoring network performance and providing security becomes more critical. Port mirroring and other traditional monitoring methods are costly to scale in large networks and can have an impact on performance.

Testing access points, TAPs, or, more specifically, optical taps can provide significant network traffic visibility that can be used to enhance security without degrading performance. Optical taps contain an optical splitter that creates a copy of the signal as it passes through with reliability and without moving parts or power consumption. Taps are generally unidirectional, meaning they only redirect a small amount of energy of a transmitted signal and never inject additional energy or signals to the tapped channel.

However, bidirectional taps can also be useful to operate with Ethernet BiDi transceivers or different types of networks such as passive optical networks (PON). In particular, for low-density PON deployments, e.g., in rural areas, a set of optical taps permits more efficient distribution of the optical signal using fewer fibers than optical splitters.

Several technologies to produce optical taps are available. For example, devices based on fused biconical tapered optical fiber couplers or thin-film filters are commonly used. However, since those are discrete devices, many of them will need to be used for each transceiver. For example, a 400GBASE-DR4 will require eight optical taps, whereas an 800GBASE-DR8 will require 16 optical taps. To some degree, devices with lenses, such as the ones described in RS 16391, can be used to reduce the size of devices. However, Photonics Optical Circuits such as Planar Lightwave Circuits (PLCs), could be better suited for tapping multiple channels if crosstalk and mode mismatch between fiber and PLC waveguides are resolved.

There are several PLC fabrication methods. Currently, the majority of methods involve deposition, photolithography, and etching over silicon wafers typically of 300 mm diameter. Chemical vapor deposition (CVD) is the most common method of deposition and is used for layers of silicon dioxide and silicon nitride. During deposition, materials are grown over a silicon wafer producing layers from hundreds of nanometers to a few microns. A layer with a higher refractive index than the surrounding layers can serve as the core layer or waveguide where light propagates by total internal reflection. Other surrounding layers with a lower refractive index can serve as cladding.

During the photolithography process, material sensitive to light, known as photoresist, is deposited on top of the core layer. The wafer is exposed to UV light through a photomask, an opaque plate with transparency areas that represent the desired waveguide structure and geometry of the design. The UV exposed areas are then removed with the photoresist developer solvent when using a positive photoresist. When a negative photoresist is used, the UV exposed areas remain and the unexposed removed. After some photoresist regions are removed, portions of the core layer become unprotected and can be etched using reactive-ion etching.

Waveguides fabricated using the photolithography process mentioned require a mask to be fabricated for each new structure. Also, the photolithography process limits the device fabrication to 2D configurations with high refractive index contrast waveguides, which causes high mode mismatch between waveguide and fiber core and, therefore, coupling losses. Also, a PLC with waveguides in 2D configuration can have multiple crossovers among waveguides, which increases losses and crosstalk.

A more recent PLC fabrication method is direct laser writing waveguide on glass (DLWW). Although the discovery that lasers could cause permanent refractive index changes in glass dates from the 1970s, it was not until the development of femtosecond lasers in the 1990s that more efficient processes to induce refractive index changes in doped and undoped glasses started being developed.

A femtosecond laser, which produces high-intensity pulses that last 10s or 100s of femtoseconds, enables efficient nonlinear absorption of several near-infrared (NIR) photons to modify the glass properties.

The nonlinear absorption of NIR pulses is less damaging than UV absorption, facilitates the use of less expensive and more versatile optics to control the intensity spatial profile in the glass and works in a wide range of glasses. There has been significant progress in DLWW during the last decade to reduce waveguide distortions and other defects that degrade propagation and coupling losses. Aberrations dependent on the waveguide geometry and depth as well as nonlinear optical effects such as self-focusing are the main cause of those defects. Techniques such as dual beams and spatial light modulators (SLM), and simultaneous spatialtemporal focusing (SSTF) have been used to modify the incident beam shape and produce the desired intensity profile inside the glass.

These novel DLWW techniques can be used to implement DLWW to complex PLCs, with the advantages of implementing 3D geometries. DLWW can also facilitate rapid prototyping and one-step maskless fabrication, which is important for developing optical integrated communication devices. DLWW can be used to fabricate waveguides with similar properties to single-mode fiber, SMF, which is advantageous in reducing the coupling losses. DLWW enables 3D geometries which practically eliminate the waveguide crossover and crosstalk among channels.

DLWW can be a useful technique for manufacturing 3D multichannel optical taps. However, there are two main limitations of DLWW that require careful design of the waveguides: the propagation losses, which are higher or at best similar to the ones produced by the lithography processes mentioned previously, and bend losses caused by the relatively low index contrast of the waveguides. Multichannel optical tap apparatus, using compact, low loss, and negligible crosstalk PLC designs and means to overcome the limitations mentioned above, are disclosed in this application.

SUMMARY

A multiport passive photonic light circuit chip has multiple waveguides written in at least two layers on a glass substrate. Some waveguides connect transmitting and receiving ports of an optical channel, some waveguides redirect a fraction of optical signals to some other receiving ports, and waveguides have circular cross-sectional shapes wherein a refractive index contrast is in the range of 0.2% to 2%.

BRIEF DESCRIPTION OF THE DRAWINGS

FIG. 1A shows a first embodiment 200 of an optical tap coupler according to the present invention.

FIG. 1B is a side view of the optical tap coupler of FIG. 1A.

FIG. 1C is an edge view of the optical tap coupler of FIG. 1A.

DESCRIPTION OF INVENTION

Figure 2:
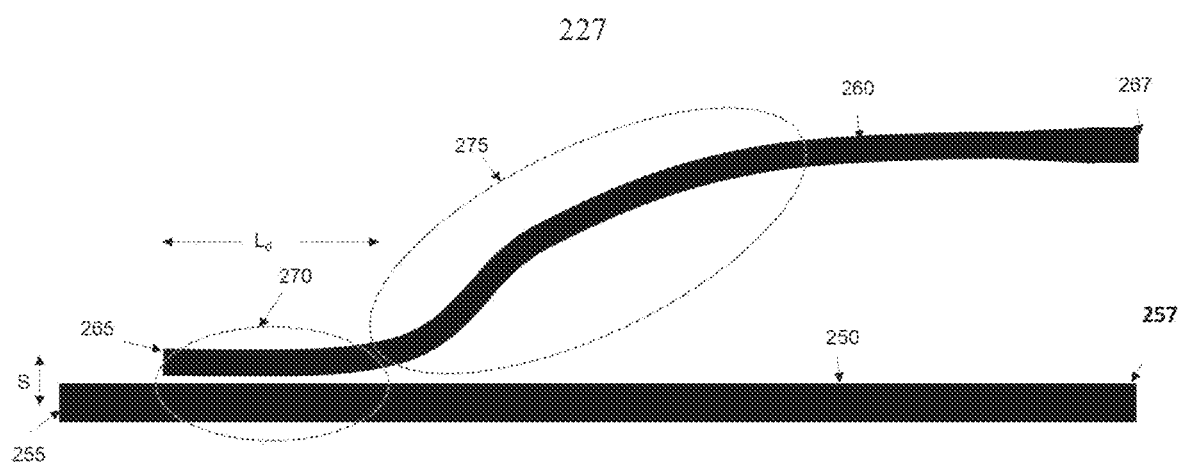
FIG. 2 shows a detailed view of one of the splitters of FIG. 1A.

Optical tap couplers are three-port (or four-port) passive components often used in optical communication networks to split predetermined proportions of optical signal power to monitor the state of the network. Optical tap couplers using fused biconical tapered fibers or thin-film filters are mature technologies optimized for low excess losses and relatively uniform response over a broadband optical spectrum. However, as data centers embrace complex network topologies, multichannel taps with smaller form factors will be needed to reduce cost and rack space and improve reliability. Without multichannel taps, tapping signals from just one eight-lane transceiver, e.g., 800GBASE-DR8, would require sixteen discrete tap devices, each comprising at least one filter and two lenses and fiber interfaces.

DLWW, a relatively new technique, can enable the fabrication of multichannel optical tap waveguides with low index contrast and circular shapes closer to single-mode fiber, SMF, which reduces the coupling losses. Moreover, 3D geometries enabled by DLWW practically eliminate the crossover of waveguides and, therefore, the optical crosstalk among channels. However, this technology has limitations, such as propagation and bending losses, tight tolerances, and requiring a careful waveguide design.

An advantage of the invention disclosed in this document is to provide small form factor optical tap couplers capable of supporting communication signals transmitted over multiple channels, with negligible crosstalk or noise penalties and limited excess losses beyond the designed split ratio. Another advantage is to provide a high-density optical tap coupler with a reduced number of components, which supports the future scaling of monitoring capabilities while improving the network's reliability.

The devices disclosed here also maintain uniformity of tap coupling ratio, TCR, over a specified wavelength range, λ, used by multichannel transceivers.

The invention disclosed in this document focuses on transmitters with four and eight channels, such as 400GBASE-DR4 and future 800GBASE-DR8. Several embodiments will be shown in this section. Note that all the drawings are not to scale to emphasize the main features of the devices.

FIG. 1A, FIG. 1B, and FIG. 1C show three views: top (FIG. 1A), side (FIG. 1B), and edge (FIG. 1C) of an embodiment of a four-port parallel channel DLWW PLC, 200 with twelve waveguides fabricated in a doped or undoped glass substrate 201. The PLC dimensions are length L, width, W, and height H. Those dimensional parameters are optimized to reduce propagation losses and the cost of the device.

PLC 200 has 24 ports separated into six groups, 205, 210, 215, 207, 212, and 217; each group has four ports. The PLC symmetric layout enables the transmission of optical power from ports 205 to 207 (or vice-versa) and from 210 to 212 (or vice versa) while redirecting a fraction of the signal power from ports 205 (or 212) to ports 217 (or 215). The power flow depends on the interconnections of the multiport device described in a later section of this application and on the transition method utilized in the network. For illustrative purposes, we can assume that the four ports 205 transmit optical signals from four transmitters of a multiport transceiver A. Those signals propagate to four ports 207 and from there connect to four receivers of a multiport transceiver B. Also, ports 212 transmit optical signals from four multiport transceiver B transmitters. Those signals propagate to the four ports 210 and connect to four receivers of a multiport transceiver A.

FIG. 1A shows two sections, 225 and 226, inside the PLC 200, where a fraction of the optical signal is redirected to other ports. In section 225, a fraction of the optical power that propagates between ports 205 to 207 is directed to port 217, becoming the tap signals from port 205 (transceiver A in the example). In section 226, a fraction of the optical power that propagates between ports 212 to 210 is directed to port 215, becoming the tap signals from port 212 (transceiver B in the example). In this disclosure, the optical elements that redirect a fraction of the optical signals are Y-junctions or directional couplers. Y-junctions, one of the essential components in optical networks, are used widely in passive optical networks (PONs) splitters and Mach-Zehnder modulators. Y-junctions are fabricated using the previously mentioned photolithography and, more recently, DLWW. However, the fabrication of Y-junctions of asymmetric splitting ratio using DLWW requires very high accuracy in the 3D positioning of the substrate and uniformity of the waveguides. A more practical method to implement the tap elements of asymmetric splitting ratio in section 225 is the use of directional couplers. Directional couplers, another fundamental component in photonics used to split or combine optical signals, consist of two parallel waveguides brought close together in the coupling region. Depending on the proximity, the evanescent field (an electromagnetic field that extends outside the waveguides) from one waveguide can extend over a second waveguide and excites one or more of its guided modes.

In FIG. 2, the optical element 227, a directional coupler, consists of a coupling region 270 and a branch or separation region 275. The waveguide section 250 connects the element ports 255 to 257, and the waveguide 260 connects element ports 265 to 267. In this example, the waveguide 260 starts at the beginning of the coupling region 270, and since port 267 does connect to receivers, some degree of light reflections can propagate from 267 to 265 and recouple to waveguide 250. Depending on the tap coupling ratio, it is expected that the magnitude of the reflected signal is below the receiver reflection tolerance. Depending on the coupling length of region 270, $L_d$, the separation, S, between waveguides 250 and 260, and other parameters such as width and refractive indices of the substrate and core waveguide, it is possible to transfer up to 100% of the light from one waveguide to another. The optical power transfer to the receiving waveguide, 260, can be described by, $$P(L_d, S, \lambda) = P_o\left(\frac{k(\lambda, S)}{\sqrt{k(\lambda, S)^2 + 0.25\Delta\beta(\lambda)^2}}\right)^2 \sin^2\left(\sqrt{k(\lambda, S)^2 + 0.25\Delta\beta(\lambda)^2}\, L_d\right),$$

where $P_o$ is the optical power in waveguide 250, $\Delta\beta(\lambda)$ is the phase mismatch between propagation constants of the waveguide modes, and $k(\lambda,S)$ is the coupling coefficient which depends on the separation between the waveguides 250 and 260, the wavelength, the refractive index of the core and substrate and the dimension of the waveguide among other parameters. The tap coupling ratio is defined here as, $$TCR(L,\lambda)=P(L_d,S,\lambda)/P_o$$

The coupling uniformity of the device inside its operational spectrum is essential. The uniformity parameter, which represents the variation of insertion loss between through and tap ports, is given by, $$\text{Coupling Ratio}(L_d, S, \lambda) = -10\log10\left(\frac{TCR(L_d, S, \lambda)}{1 - TCR(L_d, S, \lambda)}\right).$$

Figure 3A:
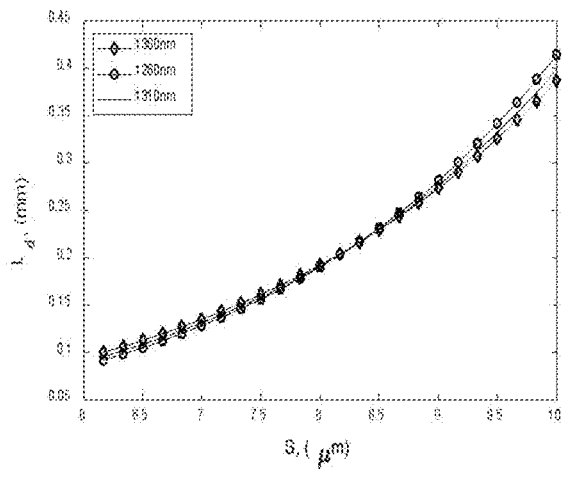
FIG. 3A shows a graph of the relationship between coupling length and waveguide separation for a coupling length of 200 μm.
Figure 3B:
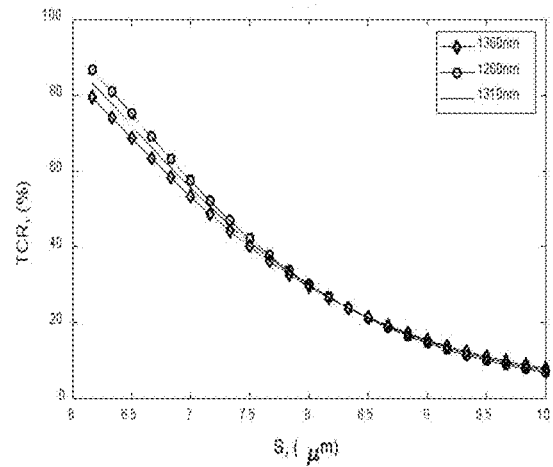
FIG. 3B shows a graph of the relationship between tap coupling ratio and waveguide separation for a coupling length of 200 μm.
Figure 3C:
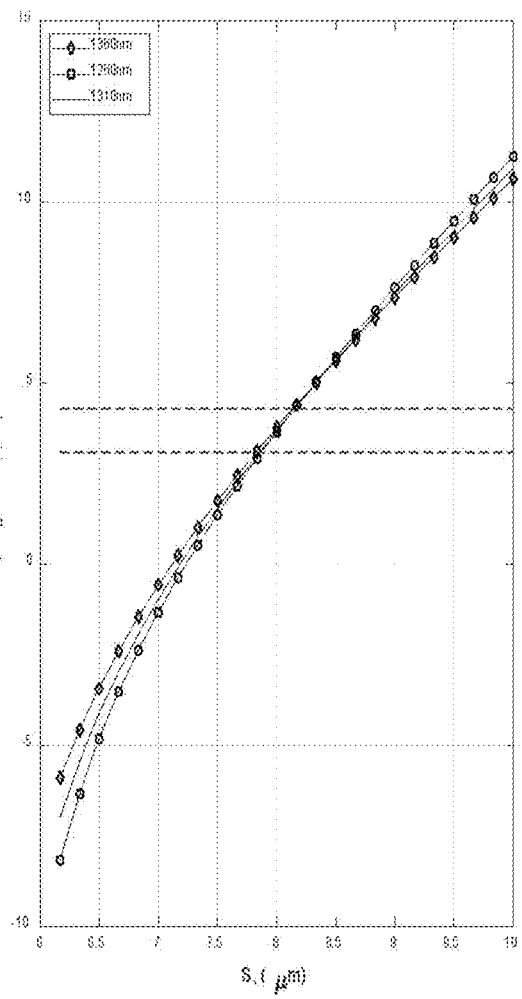
FIG. 3C shows a graph of the relationship between coupling ratio and waveguide separation for a defined set of wavelengths for a coupling length of 200 μm.

To determine the range of operation of the multichannel taps disclosed here, we study the effect of variations of TCR and the Coupling Ratio as a function of S, $L_d$, and wavelength. Some of the results are shown in FIGS. 3A, 3B, 3C and FIGS. 4A, 4B and 4C for a nominal TCR of 0.3. FIG. 3A shows the optimum $L_d$ as a function of S for three wavelengths. FIG. 3B shows the variation of TCR as a function of S for a selected $L_d$ value of 200 μm. A device that can provide an identical coupling ratio, independent of the wavelength, is desired. Such an ideal case will show the curves shown in FIGS. 3A, 3B, 3C and FIGS. 4A, 4B, and 4C converging to one (wavelength-independent). However, due to the chromatic properties of material and waveguide, the response of the coupler will always have some wavelength dependance. Our model indicates that the TCR for a given S has low sensitivity to wavelengths in the whole O Band range (1260 nm-1360 nm). For example, for S>7.5 μm, the variations of TCR for 1260 and 1310 are negligible. Similarly, part (c) of the figures indicates low dependence of the coupling ratio with wavelength. These results indicate that multichannel devices can operate in a broad range of wavelengths. However, tight tolerances are required when small values of S and $L_d$ are used. Those tight tolerances can reduce/increase the yield/cost of the device.

Figure 4A:
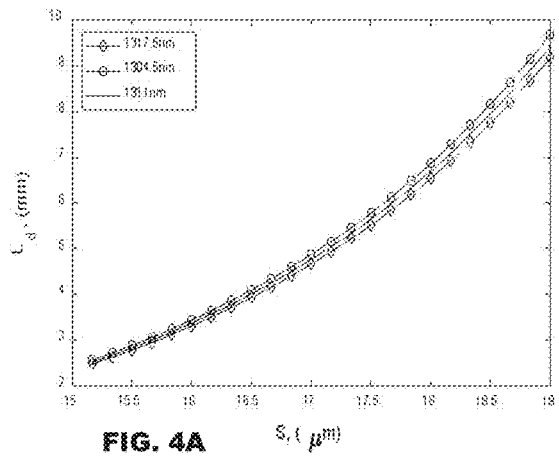
FIG. 4A shows a graph of the relationship between coupling length and waveguide separation for a coupling length of 5 mm.
Figure 4B:
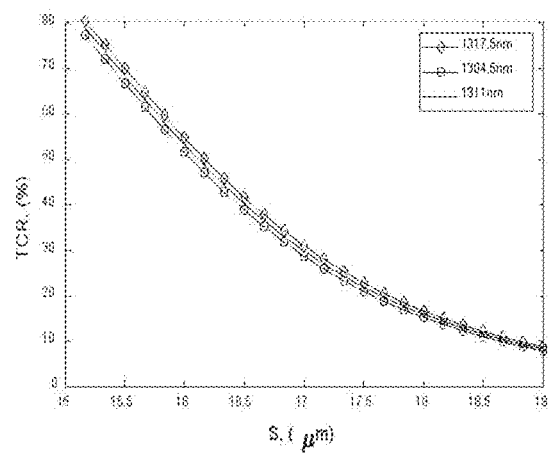
FIG. 4B shows a graph of the relationship between tap coupling ratio and waveguide separation for a coupling length of 5 mm.
Figure 4C:
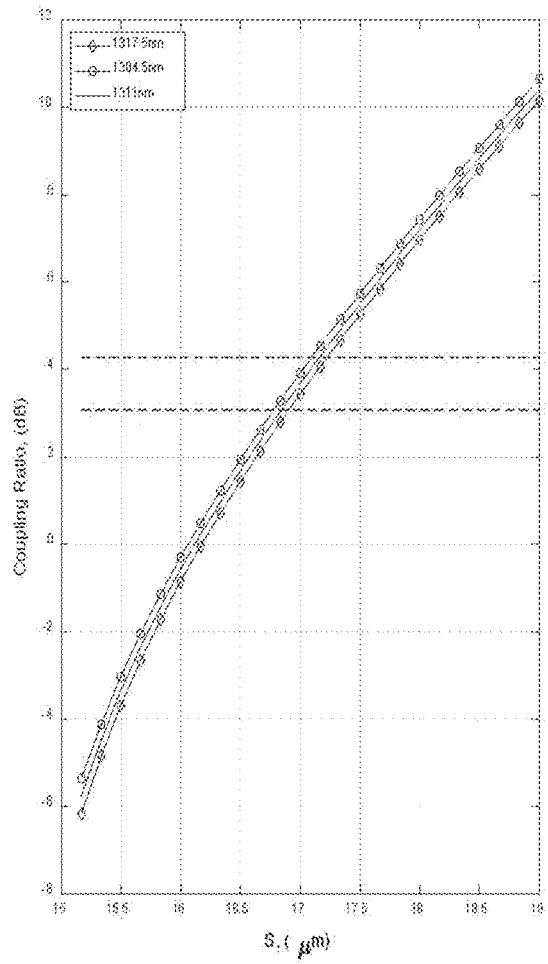
FIG. 4C shows a graph of the relationship between coupling ratio and waveguide separation for a defined set of wavelengths for a coupling length of 5 mm.

Since a much smaller range of wavelength is used in multichannel single-mode transceivers (1304.5 nm-1317.5 nm), it is possible to use larger values for S and $L_d$. For example, FIG. 4A shows that a larger S requires larger $L_d$ to provide a similar Tap coupling ratio (0.3). For S=17 μm, the coupling length is 5 mm. Those values produce a more robust design since variations on the parameters of the waveguide get averaged in a longer coupling length. FIG. 4B shows that there is a small TCR spectral dependence in the range 1304.5 nm-1317.5 nm for given values of S (17 μm) and $L_d$ (5 mm). Similarly, in FIG. 4C, it is shown that the coupling ratio variation is below 0.25 dB with the same S and $L_d$ values, which is less than values in GR 1209-CORE specifications.

In FIG. 2, light propagates after the coupling region, 270, to the branching region, 275. Waveguides fabricated using DLWW are low index contrast waveguides. Therefore, bends or curves in the waveguide design require a larger radius of curvature compared with other PLC fabrication techniques that use high index contrast waveguides. Assuming index contrast between 0.3% to 1%, a radius of curvature for DLWW is in the range of 10 to 25 mm.

The splitter 227, shown in FIG. 2, is replicated four times in each of the coupling regions 225 and 226. As shown in FIG. 1A, each of the four splitters in region 225 redirects a fraction of the optical signals, a nominal TCR, from ports 205 to ports 217. The TCR is maintained below a specified tolerance, e.g., ±0.6 dB, for a designed operational spectrum, e.g., the O band. Each waveguide connecting the output of Section 225 to ports 217 is slightly bent to connect to another upper or lower layer in the glass. For the disclosed designs, at least two layers are needed, as shown in FIG. 1B (cross-sectional view). The height separation between the layers can range from 50 µm to 1 mm. The optimum height separation depends on the manufacturing process. In some cases, a small distance, e.g., 80 µm, facilitates the fabrication since the beam shape is less affected by a slight change in depth. Also, smaller distances between layers can improve the waveguide density. However, increasing density beyond a certain level can change the properties of adjacent waveguides and produce non-uniformities or undesired coupling. In FIG. 1B, it can be seen that the waveguides from ports 205 and region 225 are located in the top layer. In contrast, after region 225, the waveguides 232 are directed to a bottom layer and continue there until they connect to ports 207.

After region 225, waveguides 220, located in the top layer, propagate a fraction (1-TCR) of the optical signals to ports 207.

Also, in this example, the waveguides that connect ports 212 and region 226 are located in the top layer of the glass. The four splitters in region 226 redirect a fraction of the optical signals, a nominal TCR, to ports 215 using waveguides written on a lower layer in the glass. After region 226, the waveguides that propagate a fraction (1-TCR) of the optical signals to ports 210 are located on the top layer of the glass.

FIG. 1C, one edge view of the device shows the ports 207, 212, and 217, that will connect to fiber arrays as described later in this application. The other edge of the device (not shown here) has ports 205, 210, and 215. Both edges of the device need to be polished to minimize coupling losses to fiber arrays.

Figure 5A:
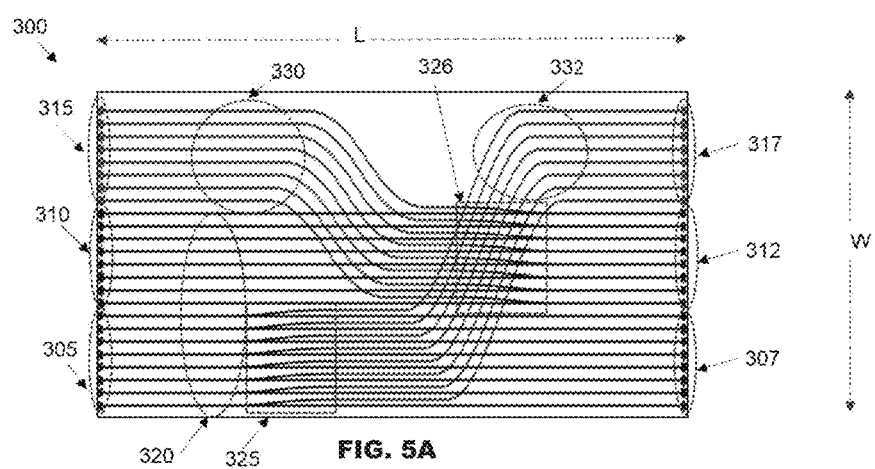
FIG. 5A shows a second embodiment 300 of an optical tap coupler according to the present invention.
Figure 5B:
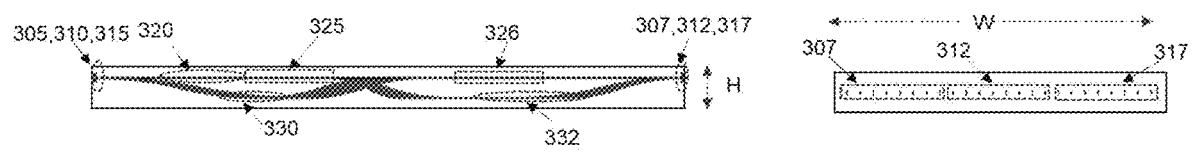
FIG. 5B is a side of the optical tap coupler of FIG. 5A.
Figure 5C:
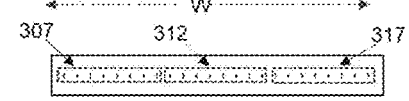
FIG. 5C is an edge view of the optical tap coupler of FIG. 5A.

The previous embodiments, shown in FIGS. 1A, 1B, and 1C, describe a four-port parallel channel DLWW PLC, 200, with twelve waveguides useful for channels deploying transceivers such as 400GBASE-DR4. FIGS. 5A, 5B and 5C show an embodiment, PLC, 300, for an eight-port parallel channel useful for channels deploying future 800GBASE-DR8 transceivers or others with a similar number of ports.

PLC 300 has 48 ports (and 24 waveguides) separated into six groups, 305, 310, 315, from one side of the device and 307, 312, and 317 from the other side. Each group has eight ports. The PLC enables the transmission of optical power from ports 305 to 307 and from 312 to 310 (or vice versa) while redirecting a fraction of the signal power from ports 305 (or 312) to ports 317 (or 315) depending on the interconnections of the device described in a later section of this application.

There are two sections, 325 and 326, inside the PLC 300, where the light power is split and redirected to other ports following a similar mechanism described previously for embodiment 200. For example, in section 325, a fraction of the optical power that propagates between ports 305 to 307 (through ports) is directed to port 317 (tap ports). In section 326, a fraction of the optical power that propagates between ports 312 to 310 is directed to port 315, becoming the tap signals from port 312. There are at least two layers on the glass where the optical waveguides are written, as shown in FIG. 5B (cross-sectional view). In that figure, the waveguides 320 that connect ports 305 to region 325 and the whole region with splitters are located in the top layer. After region 325, the waveguides are written in the bottom layer; see, for example, waveguides 332.

Similarly, after region 326, the waveguides 330 that transport a fraction of the optical signals to ports 315 are written on a lower layer in the glass. FIG. 5C, one edge view of the device, shows the ports 307, 312, and 317, that will connect to fiber arrays as described later in this application. The other edge of the device (not shown here) has ports 305, 310, and 315. Both edges of the 300 need to be polished to minimize coupling losses to fiber arrays.

In another modification of embodiment 300 (not shown here), the taps ports 317 are positioned before ports 307. In that embodiment variation, the order of the device ports from the right edge is 317, 307, and 312 instead of 307, 312 and 317 shown in FIG. 5A. This modification will equalize the length of all the tap ports.

Embodiments 200 and 300 minimize size and fabrication cost since all the ports are grouped together at the same layer with a fixed distance between waveguides, e.g., 127 microns or 250 microns. Note that the pitch of the waveguide array near the ports needs to match pitch of the fiber array interface. However, waveguides far from the ports can have close separation among them.

Figure 6A:
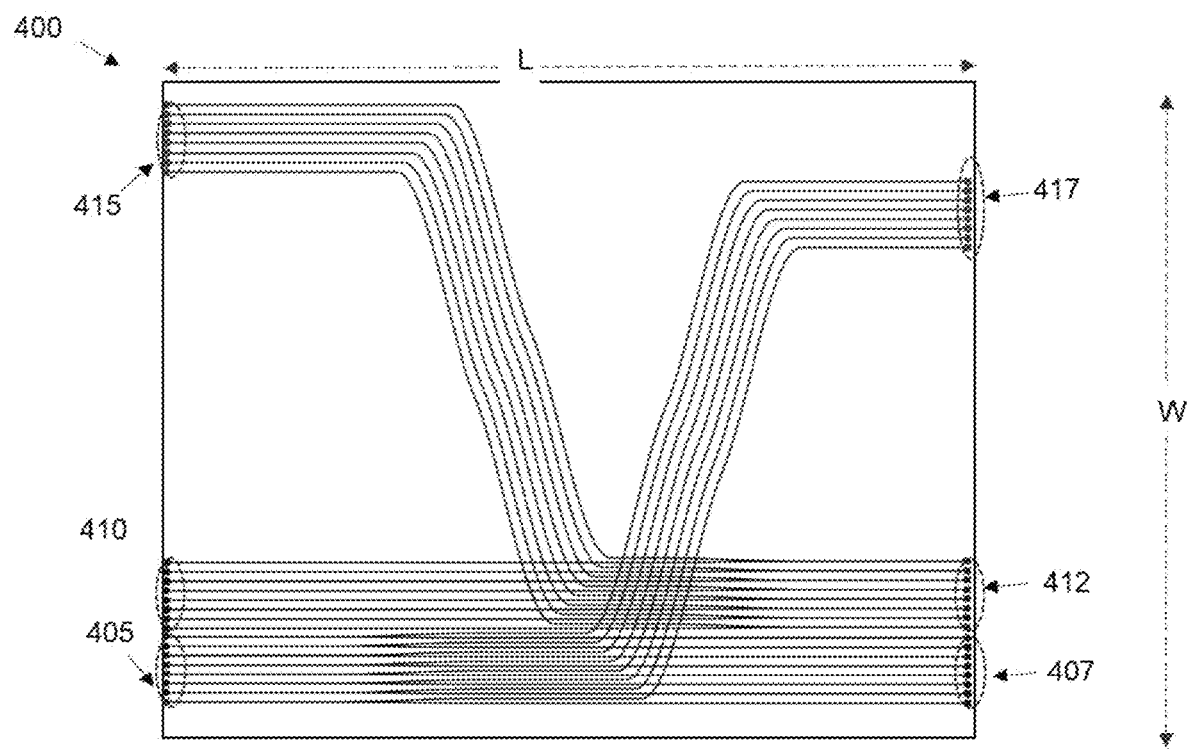
FIG. 6A shows a first embodiment 400 of an optical tap coupler according to the present invention.
Figure 6B:
FIG. 6B is a side of the optical tap coupler of FIG. 6A.

There are some cases where more area in the optical chip is allowed, and it would be preferable to separate the through and tap ports in the PLC. Embodiments 400 to 500 shown in FIGS. 6A and 6B and FIGS. 7A and 7B show designs to achieve this. In FIG. 6A, embodiment 400, an eight-port tap device, the tap ports 415 are separated from ports 405 and 410 (through ports). Also, the taps ports 417 are separated from ports 407 (through port) and 412. FIG. 6B of the same figure shows that after splitting, waveguides are written in a second layer (bottom layer in this example) to avoid crossovers that produce losses and crosstalk.

Figure 7A:
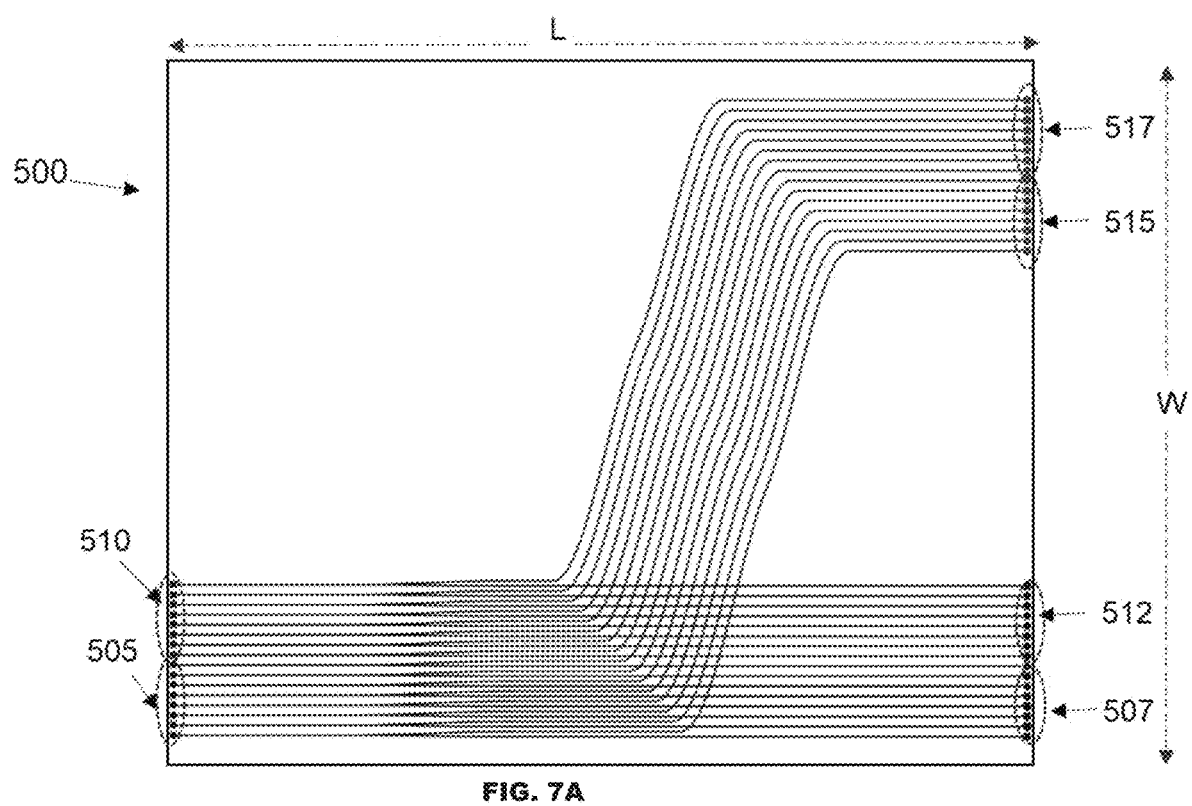
FIG. 7A shows a first embodiment 500 of an optical tap coupler according to the present invention.
Figure 7B:
FIG. 7B is a side view of the optical tap coupler of FIG. 7A.

FIG. 7A, embodiment 500, an eight-port tap device, the tap ports 515 and 517 are separated from the through ports 505-507 and 510-512. FIG. 7B of the same figure shows that after splitting, waveguides are written in a second layer (bottom layer in this example) to avoid crossovers that produce losses and crosstalk.

Several embodiments for multichannel optical taps were disclosed. In all of them, the assigned order for top and bottom layers is interchangeable as long as all the waveguide trajectories do not cross among them and a minimum separation distance, e.g., ≥20 µm is maintained. The interconnection methods for the mentioned embodiments are shown in the following section.

The preferred embodiments in this disclosure are written in glass utilizing the DLWW method. However, with some modification to the wavelength (or wavelengths) of light, the optics to focus the beam, the repetition rate and/or the power of the femtosecond laser, it is possible to write the disclosed waveguide designs directly on polymer and silicon substrates.

More advanced technology may allow the waveguide to be written utilizing multiple wavelengths or variable reputation rates as the laser applies focus through the glass—this can provide waveguides with variable width or refractive index/contrast (i.e., the difference between the refractive index of the waveguide and the surrounding glass). Changing the diametrical spot size of the laser dynamically while maintaining power density allows you to change the diameter of the waveguide, while keeping the index refraction constant or variable, depending on the application. For example, up taper or a down taper that's useful for things like mode conversion, mode matching, mode filtering, and stripping out modes.

Figures 8A, 8B:
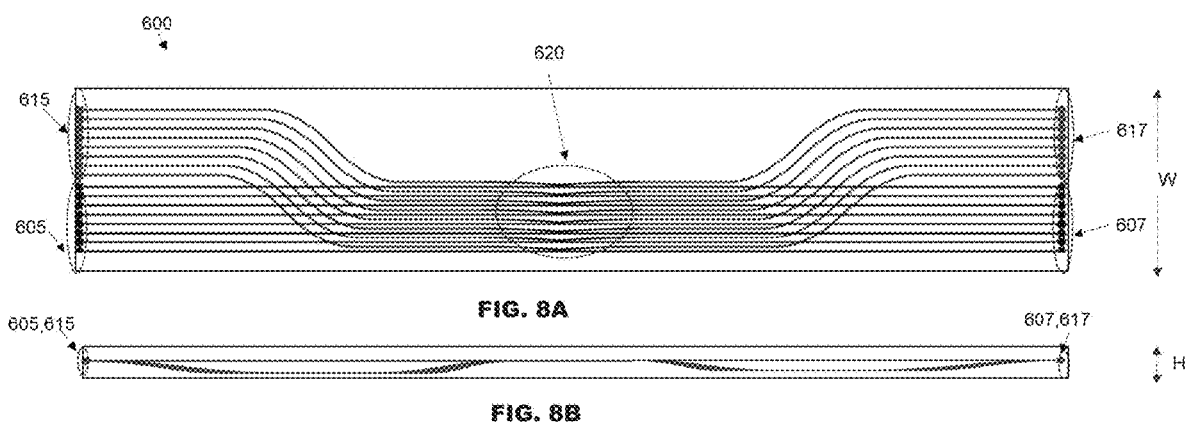
FIG. 8A shows a first embodiment 600 of an optical tap coupler according to the present invention.
FIG. 8B is a side view of the optical tap coupler of FIG. 8A.

Bidirectional taps are also be implemented using DLWW, as shown in FIGS. 8A and 8B. In this embodiment 600, the signal propagates from port 605 to 607 and vice versa, usually using a different wavelength, e.g., one wavelength for each direction. The directional couplers in region 620 redirect a determined amount of power from port 605 to 617 for signals propagating from 605 to 607. Conversely, for signals propagating from 607 to 605, the tap signals are redirected to port 615.

The waveguides are viewed from the top and from the side in FIGS. 8A and 8B.

Figure 9:
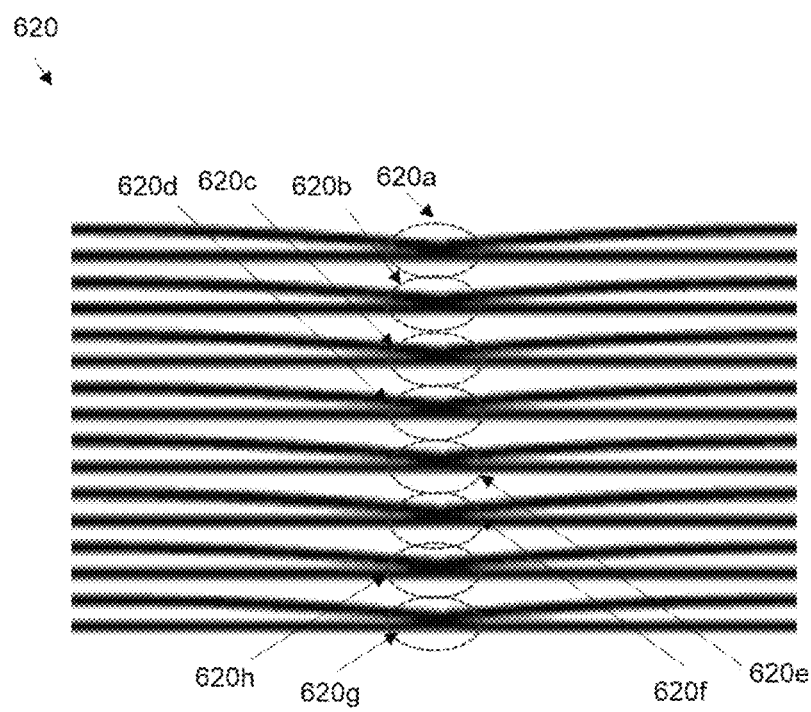
FIG. 9 Illustrates a magnification of the coupling region showing eight directional couplers.

FIG. 9 shows a magnification of the coupling region 620. In this example, there are eight couplers that can provide tap signals for eight Bi-Directional (BiDi) ports. In one embodiment, each coupler subregion, 620a, 620b, 620c, 620d, 620e, 620f, 620g, and 620h, have the same parameters S, and $L_d$, and therefore the same coupling ratio for a given wavelength. However, when two different wavelengths are used, e.g., λ1 for 605 to 607 propagation and λ2 for 607 to 605 propagation, the couplers can be designed either to provide a similar coupling ratio for both wavelengths or different coupling ratio for each one. The latter can be advantageous for some passive optical network deployments where the downstream signal, e.g., λ1, needs to be dropped with a different coupling ratio than the upstream, e.g., λ2.

For many rural deployments, one fiber is used to connect multiple users, e.g., 64, in a large area. In those low-density populated areas, a set of couplers separated hundreds of meters is used. In those installations, it is desired to equalize the power of each drop. This can be achieved by selecting taps of diverse tap ratios. Having a stock of different components, e.g., different part numbers, increases the complexity of the installation. Having a compact device that can provide multiple taps and one part number can be extremely advantageous for those installations. A variant of embodiment 600, using different S, and $L_d$, for each coupler, 620a, 620b, 620c, 620d, 620e, 620f, 620g, and 620h, can provide multiple coupling ratios in one compact device. During deployment, the installer can use a set of the same devices 600, which can be connectorized as shown in a following section, and select the port with the desired coupling ratio.

Interconnection of PLC Devices to Assemblies or Modules

Figure 10:
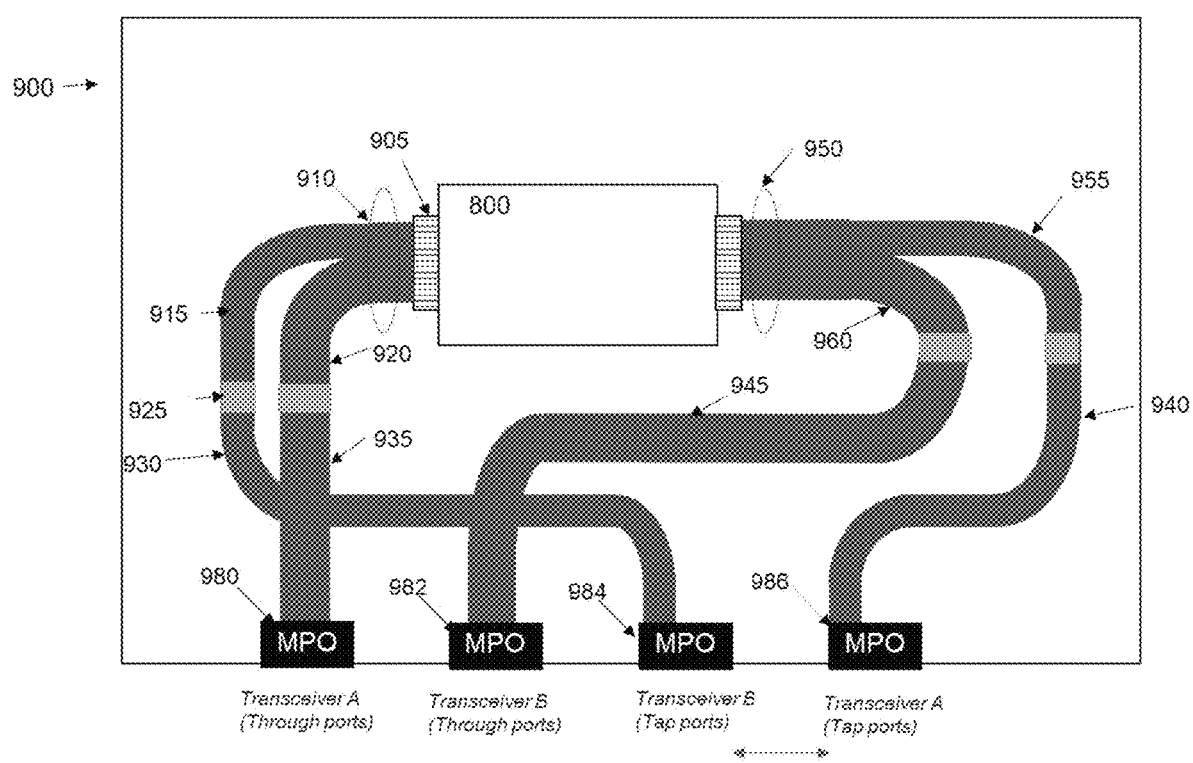
FIG. 10 shows an example for a connection of the PLC inside a module.

The use of the PLCs 200, 300, 400, 500, and variations of them, with more separation between ports or more channels, is described. FIG. 10 shows a module 900, which is an enclosure that supports and protects the PLC 800 and fiber interconnections. One or more faces of module 900 have multiport connectors such as MPOs, MMC, or groups of SN, MDC, or alternatively, groups of duplex connectors such as LC connectors. In the figure, the module has four MPO ports on one side of the device. The PLC, 800, represents embodiments 200, 300, 400 or 500.

The outputs of PLC 800, for example, 305, 310, and 315 (shown in FIGS. 5A, 5B and 5C connect to a fiber array 905. The fiber array, commonly used to couple light into and out of PLCs, consists of one or two-row arrays of optical fibers placed on a high-precision v-groove chip which is covered with a lid on the top. The end face of the fiber array is optically polished, and it can be purchased with a flat or angled polished end face with or without antireflection coating (ARC). In the disclosed invention, the group of fibers, 910, is separated into at least two groups, 915 and 920. Therefore, assuming 800 represents PLC 200 or 300, the ports 205-210 or 305-310 connect to fibers 920, whereas tap ports 215 or 315 can correspond to fibers 915.

Similarly, from the other side of the PLC 800, the group of fibers, 950, is separated into at least two groups, 955 and 960. The ports 207-212 or 307-312 connect to fibers 960, whereas the tap ports 217 or 317 connect to fibers 955. All those fibers 915, 920, 955, and 960 are connected to fibers 930, 935, 940, and 945, respectively, using fusion or mechanical splices represented by 925. In other designs with less restricted values for insertion loss, element 925 can also be a mated multifiber connector pair. Fibers 930, 935, 940, and 945 are terminated in multifiber or groups of duplex connectors placed on one or more faces of module 900.

PLC 400 or 500 have separated through and taps ports. For example, 405-410 and 505-510 are separated from ports 415 and 515. Therefore modules 900 using those PLCs require at least four fiber arrays.

Figure 11A:
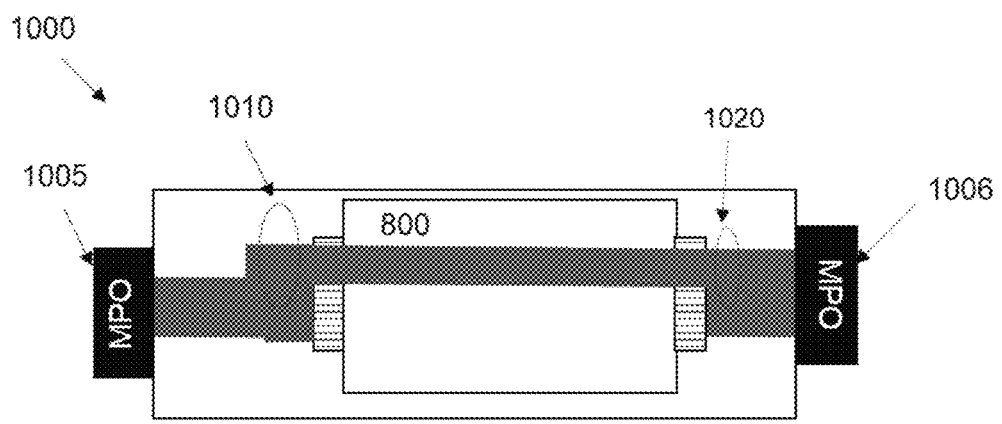
FIG. 11A and FIG. 11B show other examples for a connection of the PLC inside a module.
Figure 11B:
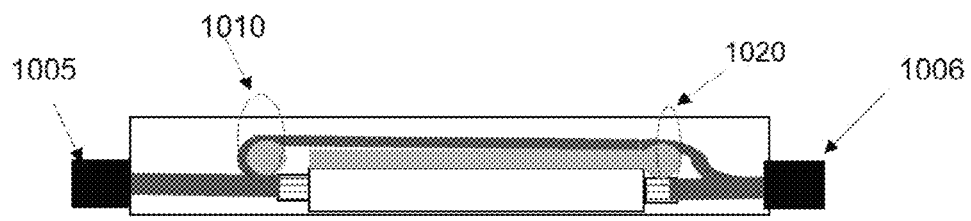

In another embodiment 1000, shown in FIGS. 11A and 11B, an inline module with only two parallel ports can be achieved by redirecting tap fiber 1010 to the opposite side of the chips. This embodiment, which has only two connectors, e.g., MPO 1005 and 1006, can be advantageous for some structured cabling systems, where security protocols require deploying the active tap equipment in a different area than switches and servers. Therefore, pass-thru and taps signals will travel in the same cable interconnect until they reach another passive component that separates through and taps signals. Since there are only two ports in embodiment 1000, it can also be implemented as an inline connector.

The invention claimed is:

1. A module comprising a multiport passive photonic light circuit chip comprising multiple waveguides written in at least two layers on a silicon substrate, where some waveguides connect transmitting and receiving ports of an optical channel, where some waveguides redirect a fraction of optical signals to some other receiving ports (tap ports) of the device where waveguides have circular or elliptical cross- sectional shapes, with refractive index contrast is in the range of 0.2% to 2%, where the module has two multifiber connectors connecting input and output ports of a channel, where the multifiber connectors are coupled to tap ports of the chip, where one of the multichannel connectors carry through and taps signals.

* * * * *